Figure 3:
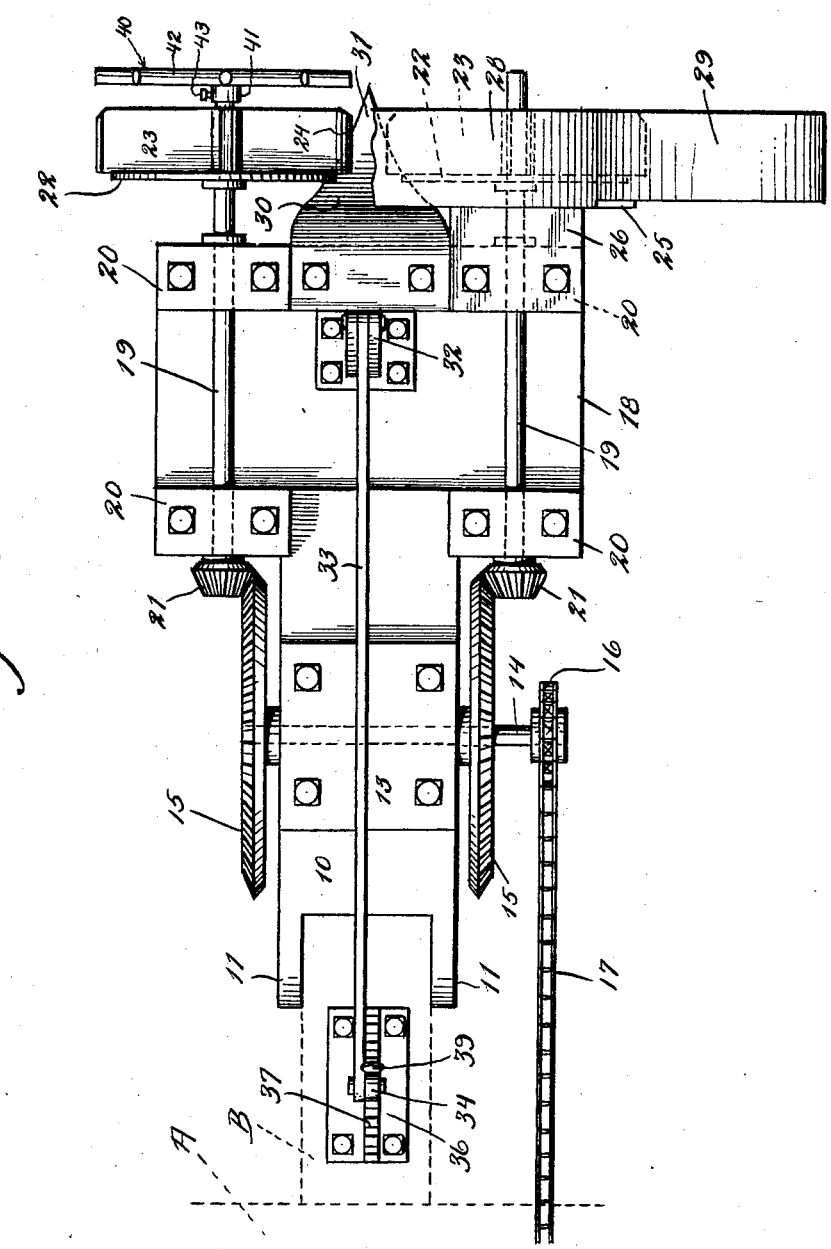

H. T. BROWN.
SNOW REMOVER.
APPLICATION FILED JUNE 18, 1920.
1,388,509.
Patented Aug. 23, 1921.
2 SHEETS—SHEET 1.
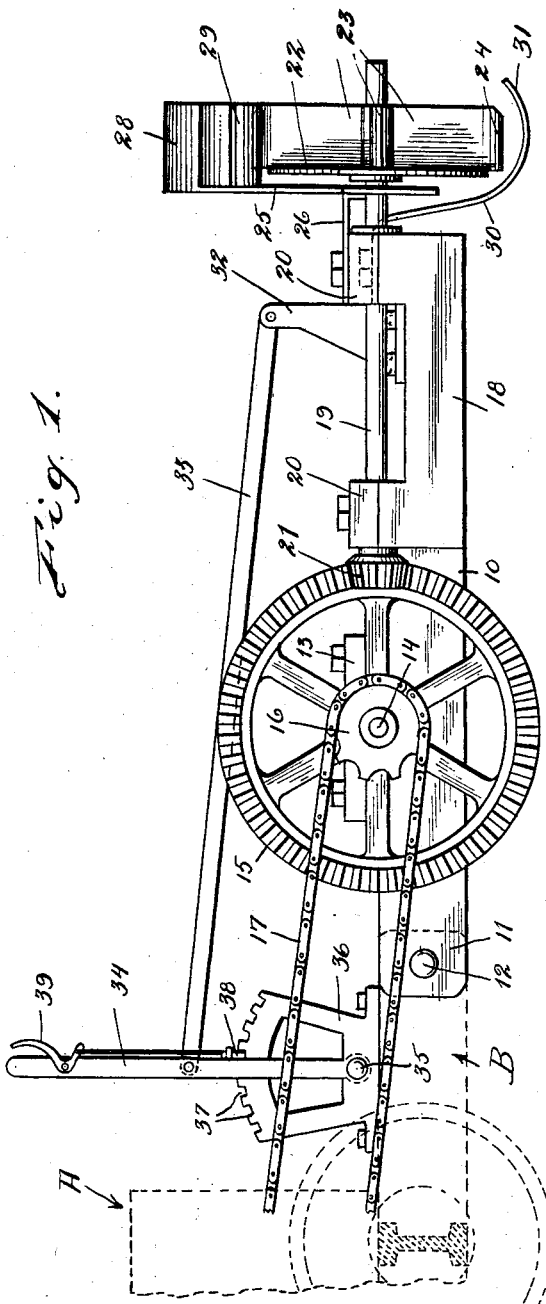
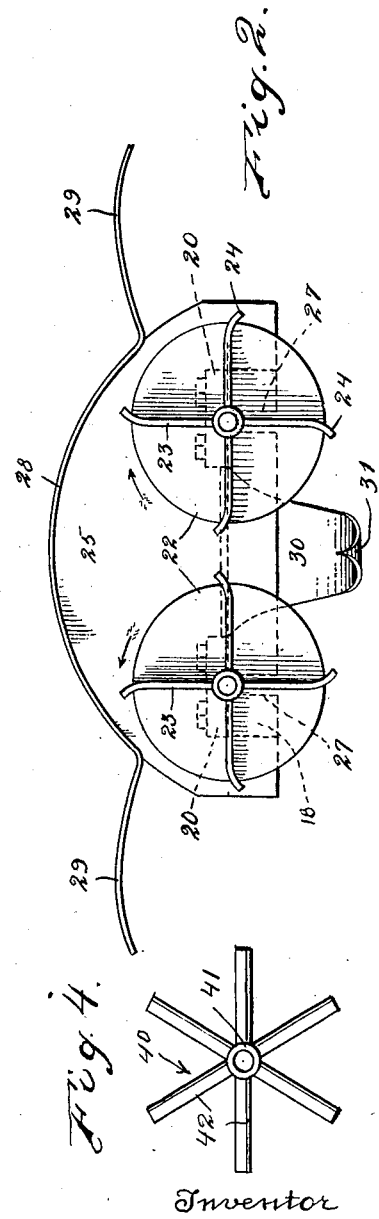
Witness:
John M. Jester
Inventor
Harley T. Brown
by H. A. Gourick
Attorney

H. T. BROWN.
SNOW REMOVER.
APPLICATION FILED JUNE 18, 1920.

1,388,509.

Patented Aug. 23, 1921.
2 SHEETS—SHEET 2.

Witness:
John M. Jester

Inventor
Harley T. Brown
by H. A. Gowrick
Attorney

UNITED STATES PATENT OFFICE.

HARLEY T. BROWN, OF HUBBARDSTON, MICHIGAN.

SNOW-REMOVER.

1,388,509. Specification of Letters Patent. Patented Aug. 23, 1921.

Application filed June 18, 1920. Serial No. 389,901.

*To all whom it may concern:*

Be it known that I, HARLEY T. BROWN, a citizen of the United States, residing at Hubbardston, in the county of Ionia and State of Michigan, have invented new and useful Improvements in Snow-Removers, of which the following is a specification.

This invention relates to road machines and has for its object the provision of a device for removing snow from roads so as to fit the roads for traffic.

An important object is the provision of a device of this character which is formed as a complete structure adapted for association with a tractor or other similar device whereby it may be propelled along the road, my device including a pair of rotary fans suitably driven by transmission devices operated by the tractor, these fans operating to throw the snow to the sides of the road so as to leave the roadway clear.

A further object is the provision of a device of this character which is pivotally mounted with respect to the tractor and which is provided with means whereby it may be tilted up or down as the case may be so as to follow irregularities in the roadway and so as to be used successfully on hills without danger of breaking the rotary fans or the adjacent parts of the device.

An additional object is the provision of a device of this character which is simple and inexpensive in manufacture, efficient in use, durable in service, and a general improvement in the art.

With the above and other objects and advantages in view, the invention consists in the details of construction to be hereinafter more fully described and claimed, and illustrated in the accompanying drawings in which—

Figure 1 is a side elevation of my device showing it associated with the front of a tractor, the tractor being shown diagrammatically, Fig. 2 is a front elevation, Fig. 3 is a plan view with a portion of the protective shield for the fans broken away, Fig. 4 is a detail view of a detachable guard.

Referring more particularly to the drawings, the letter A designates a portion of the front of a tractor shown diagrammatically, and B designates a bar extending forwardly from the tractor. In carrying out my invention I provide a frame or platform 10 which is provided at its rear end with spaced ears 11 embracing and pivotally connected with the bar B, as shown at 12. Journaled transversely of the rear portion of the platform, as through a suitable boxing 13, is a shaft 14 carrying a pair of relatively large bevel gears 15 located at opposite sides of the platform. This shaft also carries a sprocket 16 adapted to be driven by a chain 17 trained thereabout and driven by any suitable rotary member, not shown, of the tractor.

Journaled longitudinally of the widened front portion 18 of the platform are shafts 19 which are arranged in spaced relation and which are rotatable through suitable boxings 20. At their rear ends these shafts 19 carry bevel pinions 21 meshing with the gears 15 so that when the shaft 14 is rotated the shafts 19 will be simultaneously rotated in opposite directions.

Secured upon the forward extremities of the shafts 19 are fans, each of which includes a supporting disk 22 and a plurality of blades 23 extending at right angles to one another and to the plane of the disk and these blades have their outer ends curved, as shown at 24. The curvature at the ends of the blades of one fan is opposite to the curvature at the ends of the blades of the other fan as these fans rotate in opposite directions, as shown by the arrows in Fig. 2.

Associated with the fans is a protective shield which includes a plate 25 provided at its back with bracket arms 26 disposed upon the forward boxings 20 and secured by the bolts which hold the boxings. This plate portion 25 is formed with slots 27 for the accommodation of the shafts 19. This shield further includes a flange 28 which extends over the fans and which protects them from injury and which also prevents the snow from being thrown back onto the platform 10 and the mechanism thereon. At its end portions this flange 28 is provided with outwardly extending wings 29 which serve to guide the snow to the sides of the roadway.

Secured upon the front end of the platform 10 between the forwardmost boxings 20 is a shoe 30 which extends downwardly to a point below the fans and which has its end portion curved forwardly and upwardly, as shown at 31, and the purpose of this shoe is to hold the snow to the fans.

In order that the position of my device may be varied as when going up or down hill, I provide an upstanding bracket arm 32 secured upon the forward end of the platform and having connected therewith a link 33 which extends rearwardly and which is connected with a lever 34 pivoted at 35 upon a bracket 36 secured to the beam B. The upper end of this bracket is formed as a segmental rack 37 with which coöperates a latch bar 38 carried by the lever 34 and associated with a grip release 39.

In the use of the device it will be seen that when the parts are constructed and assembled as shown and described, and the device is carried along a road by the tractor, the gears 15 will be constantly rotating which will result in rotation of the shafts 19 and the fans. The fans will sweep or blow the snow from the roadway to the side thereof, the shoe between and below the fans assisting in properly feeding the snow to the fans. It is easily possible to follow inequalities in the road by properly manipulating the lever 34 to tilt the device upwardly or downwardly, as the case may be, and in passing over the brow of a hill or in transversing a gully, it is necessary that this lever be moved to position the forward end of the device so that the fans will operate to clear the snow without danger of the shoe 30 digging into the ground or striking against it, as such a contingency would result in serious derangement of the parts.

In order to protect the fans and break up caked snow, I may make use of guards, indicated broadly at 40, carried in advance of the fans. Each of these guards is formed as a hub 41 carrying radial arms 42. The hubs are provided with set-screws 43 by means of which they may be clamped upon the forward ends of the shafts 19. These guards rotate with the shafts when in use, but may be removed when desired.

From the foregoing description and a study of the drawings it will be apparent that I have thus provided a simply constructed and easily operated device adapted for association with a tractor and formed as an attachment therefor, the device very efficiently operating to clear roads of snow and consequently render them fit for traffic.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. In combination with a tractor, a snow removing device for roads comprising a supporting structure pivotally mounted with respect to the tractor and carried thereby, a transverse shaft on said supporting structure having drive means adapted to be driven by the tractor mechanism, a pair of forwardly extending shafts journaled on said supporting structure and operatively connected with said first named shaft whereby to be driven thereby, fans secured upon the forward extremities of said second named shafts and rotating in a vertical plane, a shield carried by the forward end of the supporting structure and having its upper portion formed as a guard for the fans and also as a guide for snow thrown outwardly by the fans, and a shoe carried by the forward end of the supporting structure and extending between and below the fans.

2. A device of the character described comprising a supporting platform adapted for pivotal connection at the front end of a tractor, a shaft journaled transversely of said platform, means for driving said shaft from the mechanism of the tractor, bevel gears carried by said shaft at opposite ends thereof, a pair of longitudinal shafts journaled on said platform in spaced parallel relation, bevel pinions carried by said last named shafts meshing with said bevel gears, fans carried by the forward extremities of said spaced shafts and rotating in a vertical plane, a shield secured upon the front end of the platform and including a plate portion extending at the rear of said fans, and a flanged portion overhanging the fans and extending laterally therebeyond to form a guide, and a shoe depending from the forward end of the platform and extending between and below said fans.

3. In combination with a tractor, a snow removing device for roads comprising a supporting structure pivotally mounted with respect to the tractor and carried thereby, a transverse shaft on said supporting structure having drive means adapted to be driven by the tractor mechanism, a pair of forwardly extending shafts journaled on said supporting structure and operatively connected with said first named shaft whereby to be driven thereby, fans secured upon the forward extremities of said second named shafts and rotating in a vertical plane, a shield carried by the forward end of the supporting structure and having its upper portion formed as a guard for the fans and also as a guide for snow thrown outwardly by the fans, a shoe carried by the forward end of the supporting structure and extending between and below the fans, an upstanding arm carried by the supporting structure, a lever movable over a segmental rack carried by the tractor, and a link connecting said arm with said lever, said lever being movable whereby to tilt said supporting structure with respect to the tractor.

4. In combination with a tractor, a snow removing device for roads comprising a supporting structure pivotally mounted with respect to the tractor and carried thereby, a transverse shaft on said supporting structure having drive means adapted to be driven by the tractor mechanism, a pair of forwardly extending shaft journaled on said supporting structure and operatively connected with said first named shaft whereby to be driven thereby, fans secured upon the forward extremities of said second named shafts and rotating in a vertical plane, a shield carried by the forward end of the supporting structure and having its upper portion formed as a guard for the fans and also as a guide for snow thrown outwardly by the fans, a shoe carried by the forward end of the supporting structure and extending between and below the fans, and guards carried by the forward ends of said second named shafts and rotating therewith, said guards being formed as detachable spider-like members.

In testimony whereof I affix my signature.

HARLEY T. BROWN.